United States Patent [19]

Chen et al.

[11] Patent Number: 4,837,230
[45] Date of Patent: Jun. 6, 1989

[54] STRUCTURAL CERAMIC MATERIALS HAVING REFRACTORY INTERFACE LAYERS

[75] Inventors: Shih-Huei Chen, San Leandro; H. O. Davis, Alameda, both of Calif.

[73] Assignee: Kaiser Aerotech, San Leandro, Calif.

[21] Appl. No.: 223,727

[22] Filed: Jul. 21, 1988

Related U.S. Application Data

[63] Continuation-in-part of Ser. No. 46,956, May 7, 1987, abandoned, which is a continuation-in-part of Ser. No. 878,454, Jun. 25, 1986, abandoned.

[51] Int. Cl.$^4$ .................... C04B 35/56; C04B 35/76
[52] U.S. Cl. ........................................ 501/88; 501/89; 501/90; 501/91; 501/92; 501/95; 501/100; 264/60; 264/65; 264/66; 423/345; 428/262; 428/284; 428/285; 428/289; 428/368; 428/378; 428/389
[58] Field of Search .................... 501/88, 89, 90, 91, 501/92, 95, 100, 60; 264/65, 66; 423/345; 428/262, 284, 285, 289, 368, 378, 389

[56] References Cited

U.S. PATENT DOCUMENTS

| | | | |
|---|---|---|---|
| Re. 31,447 | 11/1983 | Baney et al. | 264/65 |
| 3,894,863 | 7/1975 | Lachman et al. | 428/389 |
| 4,101,354 | 7/1978 | Shaffer | 428/284 |
| 4,110,386 | 8/1978 | Yajima et al. | 264/63 |
| 4,132,828 | 1/1979 | Nakamura et al. | 428/389 |
| 4,158,687 | 6/1979 | Yajima et al. | 264/60 |
| 4,278,729 | 7/1981 | Gibson et al. | 428/378 |
| 4,310,481 | 1/1982 | Baney | 264/65 |
| 4,310,482 | 1/1982 | Baney | 264/65 |
| 4,314,956 | 2/1982 | Baney et al. | 264/65 |
| 4,317,856 | 3/1982 | Huthwelker et al. | 428/285 |
| 4,414,403 | 11/1983 | Schilling, Jr. et al. | 556/430 |
| 4,472,591 | 9/1984 | Schilling, Jr. et al. | 556/430 |
| 4,492,681 | 1/1985 | Endou et al. | 423/345 |
| 4,497,787 | 2/1985 | Schilling, Jr. et al. | 423/345 |
| 4,546,163 | 10/1985 | Haluska | 528/14 |
| 4,560,589 | 12/1985 | Endou et al. | 427/249 |
| 4,568,594 | 2/1986 | Hordonneau et al. | 264/60 |
| 4,618,529 | 10/1986 | Yamamura et al. | 428/284 |
| 4,642,271 | 2/1987 | Rice | 428/378 |
| 4,722,860 | 2/1988 | Doljack et al. | 428/289 |

Primary Examiner—William R. Dixon, Jr.
Assistant Examiner—David M. Brunsman
Attorney, Agent, or Firm—Townsend & Townsend

[57] ABSTRACT

Ceramic composite articles having high flexural and tensile strength are produced by introducing multiple layers of a ceramic matrix material onto a ceramic reinforcement fabric. Crack propagation in the resulting structure is inhibited by applying refractory interface layers intermediate successive ceramic matrix layers. Such ceramic composite articles are particularly useful for high temperature applications requiring a high degree of strength, such as rocket motor insulation and turbine blades, combustion chambers, and after burners for jet motors.

57 Claims, 2 Drawing Sheets

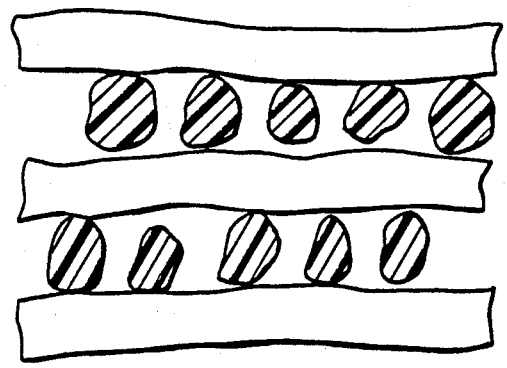
FIG.__1.
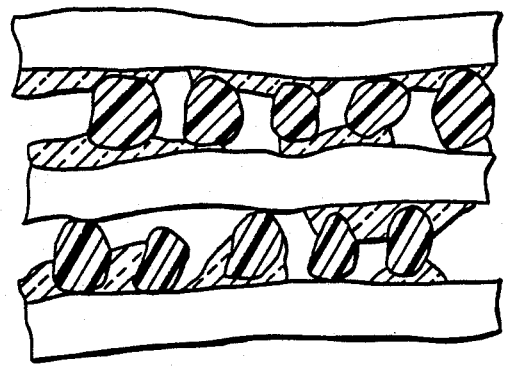
FIG.__2.
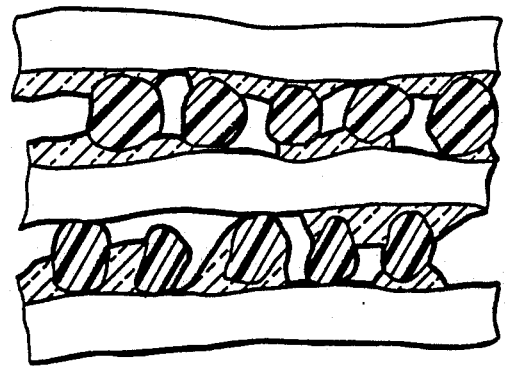
FIG.__3.

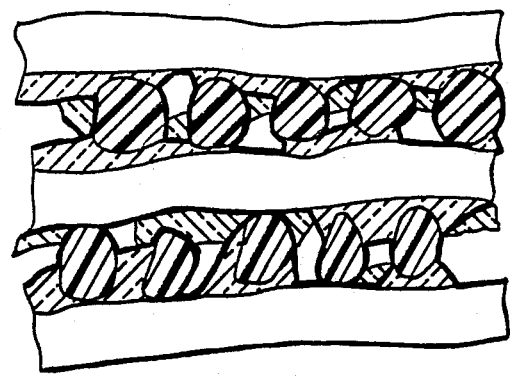
FIG._4.
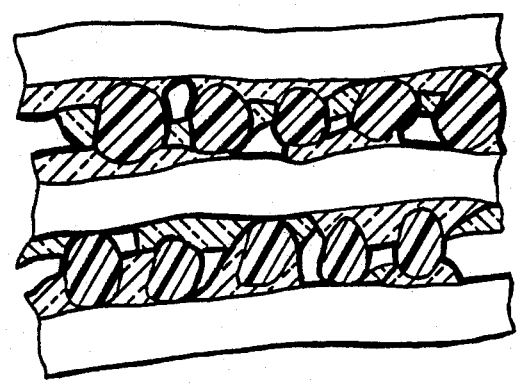
FIG._5.
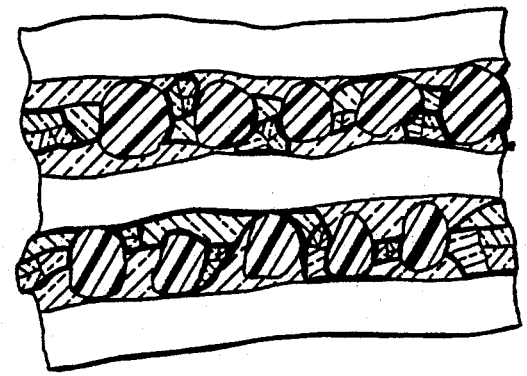
FIG._6.

STRUCTURAL CERAMIC MATERIALS HAVING REFRACTORY INTERFACE LAYERS

The present invention is a continuation-in-part of application Ser. No. 046,956, filed on May 5, 1987, now abandoned, which was a continuation-in-part of application Ser. No. 878,454, filed on June 25, 1986 now abandoned.

BACKGROUND OF THE INVENTION

1. Field of the Invention

The present invention relates generally to the preparation of structural ceramic materials, and more particularly to a process for producing reinforced ceramic composites including the introduction of retractory barrier interface layers between successive layers of a ceramic matrix material.

Structural ceramic materials are utilized in a variety of high temperature applications which may also require high strength. For example, structural ceramics are utilized as high temperature insulating materials in the construction of rocket motors and as fan blades, combustion chambers, and after burners in the construction of jet engines.

Heretofore, structural ceramics have usually been produced by one of two processing techniques. In a first technique, referred to as hot press sintering, ceramic powders, such as silicon carbide, alumina, boron nitride, and the like, are subjected to very high pressures and temperatures, typically in the range from about 1500° C. to 2100° C. While the ceramics produced by such hot press processes are generally satisfactory, the high temperatures required will usually degrade any reinforcement materials which may be present in the ceramic. For that reason, hot press ceramics are normally not reinforced and therefore possess limited fracture toughness and strength. Moreover, the high processing temperatures require the use of expensive tooling which increases the capital costs associated with the hot press process.

Reinforced ceramic composites may also be prepared by chemical vapor deposition (CVD) of a ceramic percursor material onto a fiber reinforcement substrate. The precursor material is converted to the corresponding ceramic material by conventional techniques, and the process has the advantage that the reinforcement fibers are not exposed to excessively high temperatures which can result in degradation. The process, however, also has disadvantages. In particular, the CVD process results in a non-uniform penetration of the reinforcement substrate, leading to non-uniform properties in the resulting composite material. Also, the matrix material resulting from successive application and heat treatment of the composite is often brittle with a propensity toward crack propagation, potentially leading to catastrophic failure if the material is overstressed.

For the above reasons, it would be desirable to provide efficient and economical processes for producing reinforced ceramic materials having fracture toughness and high flexural and tensile strength. Such processes should avoid subjecting the materials to very high temperatures capable of degrading the reinforcement fibers and should not require the use of expensive tooling. Moreover, the matrix material in the ceramics should be tough and resistant to crack propagation, even when subjected to high repeated stress.

2. Description of the Background Art

U.S. Pat. No. 4,546,163 discloses the pyrolytic conversion of vinyl-containing polysilanes to silicon carbide, particularly for the preparation of fibers. U.S. Pat. Nos. 4,414,403; 4,472,591; and 4,497,787, each disclose the preparation of silicon carbide by pyrolysis of certain branched polycarbonsilanes, which may include vinyl groups. The use of chemical vapor deposition of organosilicon compounds to Additionally, the high pressures required for sintering greatly complicate the formation of complex shapes and degrade the microstructure of the resulting ceramic, increasing the chance of product delamination. form silicon carbides is disclosed in U.S. Pat. Nos. 4,492,681, and 4,560,589. The preparation of silicon carbide by pyrolysis of a variety of substituted polycarbosilanes is taught in U.S. Pat. Nos. 4,310,481; 4,310,482; 4,314,956; and Re. 31,477. These patents further teach that the polycarbosilanes may be coated on articles prior to pyrolysis and conversion to silicon carbide.

SUMMARY OF THE INVENTION

Ceramic composite articles having high flexural and tensile strength are produced by (1) introducing a ceramic precursor, typically an organometallic material such as a liquid polycarbosilane, onto a fiber reinforcement fabric, (2) curing the ceramic precursor to produce a preform, and (3) converting the cured ceramic precursor to a desired ceramic matrix material by pyrolysis at temperatures which do not result in degradation of the reinforcement material. The pyrolysis is performed substantially at atmospheric pressure and causes substantial shrinkage of the ceramic matrix material, and the final composite is preferably densified by repeating the steps of polycarbosilane introduction, curing, and pyrolysis from 1 to 10 times, usually from 3 to 6 times. It has been found that by forming refractory barrier interface layers between adjacent layers of the ceramic matrix, laminar structures which are resistant to crack propagation and which possess flexural strengths on the order of 100,000 psi and above may be obtained. Pyrolysis at atmospheric pressure has significant advantages over high pressure sintering. The elimination of high pressure vessels decreases capital costs associated with the process while simultaneously allowing the formation of much more complex structures. Moreover, degradation of the microstructure of the ceramic is greatly reduced or eliminated.

BRIEF DESCRIPTION OF THE DRAWINGS

FIG. 1 illustrates an enlarged view of a portion of a reinforcement fabric useful in the practice of the present invention.

FIG. 2 illustrates the fabric of FIG. 1 after a first ceramic matrix layer has been introduced.

FIGS. 3-6 illustrate the results of alternately applying refractory interface layers and ceramic matrix layers to densify a composite article in accordance with the principles of the present invention.

DESCRIPTION OF THE SPECIFIC EMBODIMENTS

According to the present invention, ceramic composite articles are prepared by (1) introducing a ceramic precursor material, typically a liquid polycarbosilane, onto a refractory reinforcement fabric, usually a ceramic reinforcement fabric, (2) curing the precursor to set the desired geometry, and (3) converting the cured precursor to a ceramic matrix layer by pyrolysis. The present invention is directed particularly at a method for enhancing the flexural strength of such composites by applying refractory interface layers between successive matrix layers and, optionally, directly over the reinforcement fabric prior to introduction of the ceramic matrix precursor. The invention can employ virtually any conventional two- or three-dimensional ceramic fabric, and will find use as well with porous core substrates to form sandwiched ceramic articles.

For the most part, the present invention will utilize conventional two- or three-dimensional reinforcement fabrics produced by shaping refractory strands, either single fibers or yarns, into a desired geometry. The strands may be composed of a wide variety of materials, such as alumina, boron/tungsten, boron carbide, boron carbide/tungsten, boron nitride, beryllium, carbon, silicon carbide, zirconia, and combinations thereof. Typically, single fibers will have a diameter in the range from 1 to 150 microns, and yarns will be comprised of from about 100 to 10,000 fibers, more typically from about 200 to 500 fibers.

A variety of suitable shaping techniques are available, including two-dimensional weaving, filament winding, tape wrapping, and three-dimensional/multiple-dimensional weaving. The method of the present invention is of particular interest when utilized with two-dimensional, three-dimensional, and multiple-dimensional weaving techniques. A number of proprietary three-dimensional weaving systems are available, such as the Ultraweave system, available from FMI, the Avco/Brochere system, available from Avco/Brochere, Lowell, Massachusetts, the Aerospatiala system, available from Hercules, Inc. The method is also suitable with various pultrusion processes, where linear elements are formed.

A preferred method for forming the reinforcement fabrics is described in U.S. patent application Ser. No. 852,066, filed on Apr. 15, 1986, and assigned to the assignee of the present invention. The disclosure of application Ser. No. 852,066 is incorporated herein by reference.

The ceramic precursor material is selected to yield a desired ceramic after an appropriate conversion step. Particularly suitable are liquid organometallic materials which may be applied to the reinforcement substrate, cured, and converted to a corresponding ceramic by pyrolysis. A variety of organometallic materials are set forth in Table 1.

TABLE 1

| Precursor | Ceramic Material |
| --- | --- |
| Polycarbosilanes | Silicon Carbides |
| Polysiloxanes | Silicon Carbides/ Silicon Nitrides |
| Alumina with organic polymer | Alumina |
| Mullite with organic polymer | Mullite |

The liquid organometallic precursors are usually applied by dipping, spraying, manually spreading, vacuum impregnation, extrusion, or other conventional techniques. Usually, the precursor will be present in a solvent, and curing is accomplished at an elevated temperature in order to evaporate the solvent and, preferably, cross-link the polymer molecules to set the geometry of the matrix prior to conversion and further densification.

Preferred is the use of polycarbosilane precursors. Polycarbosilanes suitable for use in the present invention are liquids at room temperature and may be converted to silicon carbide ceramics by exposure to temperatures in the range from about 800° C. to 1600° C., usually in the range from about 1000° C. to 1200° C. A variety of suitable polycarbosilanes have been described in the patent and scientific literature. See, for example, U.S. Pat. Nos. 4,310,481; 4,310,482; 4,314,956; Re. 31,477; 4,546,163; 4,141,403; 4,472,591; and 4,497,787; as well as Schilling, Jr. et al., (1983) Ceramic Bulletin 63:912–915. Suitable polycarbosilanes are available from Union Carbide Corporation, Danbury, Connecticut, and Dow Corning Corporation, Midland, Michigan. Particularly preferred are vinyl polycarbosilanes.

It will usually be desirable to combine the liquid polycarbosilane of the present invention with a filler to inhibit shrinkage and degradation of the silicon carbide ceramic upon curing and pyrolysis of the polycarbosilane. Suitable fillers are generally particulate, short fiber, or ceramic powders, usually composed of alumina, boron nitride, silicon carbide, silicon dioxide, silicon nitride and the like. The filler will usually be added to a final volume percent in the range from about 10 to 50, more usually in the range from about 15 to 30, depending on the nature of the filler and the allowable shrinkage of the ceramic. A minimum filler addition of about 10% is normally required to avoid excessive shrinkage which can result in collapse of the product. Addition of from about 40% to 50% and above by volume normally results in excessive viscosity of the polycarbosilane mixture.

Prior to introducing the polycarbosilane to the reinforcement fabric, it is usually desirable to form a refractory interface layer over the fabric. The refractory interface layer acts as a barrier or buffer which inhibits crack propagation through the ceramic matrix to the reinforcement fabric, and thus acts to increase the strength (i.e., inhibit cracking) of the composite article. The preparation and introduction of such refractory interface layers will be described in greater detail hereinbelow.

The liquid polycarbosilane is prepared for introduction to the reinforcement fabric by adjusting the viscosity with a suitable solvent, e.g., xylene, and removing entrained air, moisture, and volatiles in a vacuum desiccator. The viscosity is not critical, and depends largely on the manner of application. For manual lay-up techniques where the polycarbosilane is applied by spreading on the fabric, it is desirable to have a relatively high viscosity. In contrast, when the polycarbosilane is applied by immersion, a lower viscosity is desirable. The polycarbosilanes may also be introduced by extruding a layer of a predetermined thickness onto the fabric and pressing the polycarbosilane into the fabric. The thickness depends on the thickness of the fabric, and the viscosity is not critical.

The polycarbosilane should be applied so that it penetrates the fabric thoroughly. Usually, the polycarbosilane will be applied in excess since such excess can be removed during the curing stage.

The polycarbosilane is cured in order to cross-link the polymers and set the geometry of the composite matrix. The curing will usually also drive off the solvent and other volatiles from the polycarbosilane. Curing is accomplished at a temperature in the range from about 150° C. to 250° C., usually about 175° C. to 225° C., under non-oxidizing conditions for a period of from about 1 to 10 hours. In the preferred embodiment, the reinforcement fabric having the uncured polycarbosilane is placed in a vacuum bag, with a vacuum being drawn in order to conform the bag to the shape of the article. The composite article is then heated, typically under a pressure of about 50 psi, for a time period of from about 2 to 10 hours. Alternatively, two-dimensional composite articles may be cured in a hot press or an autoclave, if desired. The cured or partially cured composite articles obtained after this step may be stored or transported for further processing elsewhere, or may be immediately processed to produce the final composite article of the present invention.

After curing, the polycarbosilane is converted into a silicon carbide ceramic matrix by pyrolysis. Preferably, the pyrolysis is carried out as a three-stage process in a furnace under an inert atmosphere, typically argon or nitrogen. The first stage of the pyrolysis is performed at a temperature in the range from about 200° C. to 350° C., usually from about 300° C. to 350° C. for a period of from about 1 to 5 hours, depending on the particular polycarbosilane. During the first stage, decomposition of the polycarbosilane commences and volatile decomposition products are evolved and driven off.

After the initial decomposition stage is completed, an intermediate pyrolysis stage is commenced by slowly raising the temperature at a rate from about 5 to 10 C.°/hour to a final temperature of about 400° C. This stage, which typically lasts from about 5 to 10 hours, is characterized by the rapid pyrolytic decomposition of the polycarbosilane accompanied by a rapid evolution of carbon and hydrogen gaseous waste products. Care should be taken not to exceed the prescribed temperature increase rate since it will lead to an even more rapid evolution of decomposition gases, which can result in disruption and damage to the composite article being fabricated.

After the temperature of the composite article reaches about 400° C., the rate of evolution of gases diminishes considerably, and the likelihood of damaging the ceramic diminishes since pores will have been formed in the matrix facilitating the escape of gases. Thus, from temperatures of about 400° C., the temperature rise can be much more rapid, typically in the range from about 35° to 70° C./hour, to a final temperature in the range from about 800° to 1600° C. This final stage, which lasts from about 5 to 20 hours, is characterized by a relatively slow evolution of gaseous waste products. The nature of the silicon carbide ceramic matrix which results from this process is largely dependent on the final temperature reached. For final temperatures below about 1200° C., the ceramic matrix will generally be amorphous in nature. Conversely, for a final temperature in the range from about 1200° C. to 1600° C., the silicon carbide matrix will have a generally crystalline nature.

All of the pyrolysis steps described above will be performed at a pressure below about 50 psi, preferably below about 25 psi, and more preferably at atmospheric pressure. High pressure processes, such as sintering processes, require more extensive equipment to perform, result in degradation of the reinforcement fabric and microstructure of the ceramic matrix, and limit the geometric complexity of the products which are formed.

The product of the process as just described will be highly porous ceramic having a relatively low density, usually on the order of about 1.5 to 1.8 g/cc. In order to increase the density and strengthen the final composite article, the product is usually densified from about 1 to 10 additional times, usually about 3 to 6 additional times, depending on the desired final density. Each stage of densification generally follows the same steps described above for the initial introduction, curing, and conversion of the ceramic matrix precursor to the reinforcement fabric. In this way, the product having a final density in the range from about 2.0 to 2.5 g/cc, usually in the range from about 2.1 to 2.3 g/cc, can be obtained. These products are characterized by very high tensile and flexural strength, with flexural strength on the order of 100,000 psi and above being possible. Strength of the composite is relatively stable with respect to temperature, usually losing only about half the flexural strength even at temperatures in excess of 1300° C.

Subsequent polycarbosilane layers are usually introduced by vacuum impregnation. The use of vacuum impregnation is appropriate since a filler is normally not employed in the densification phase, resulting in a much lower viscosity of polycarbosilane. Thereafter, the polycarbosilane is cured in an autoclave at a temperature in the range from about 150° C. to 200° C., pressure in the range from about 100 to 400 psi, for a period of about 10 to 12 hours. Pyrolysis of the cured polycarbosilane follows substantially the same steps set forth hereinabove.

After the initial ceramic matrix layer is introduced to the reinforcement fabric, a refractory interface layer must be formed over the matrix layer to inhibit crack propagation and increase flexural strength. The refractory interface material should be able to withstand high temperatures, have a low modulus of elasticity, and be capable of application in relatively thin layers, usually having a thickness in the range from about 0.1 to 3.0 $\mu$m, more usually in the range from about 0.1 to 1.0 $\mu$m. Suitable materials include carbon, carbon-ceramic mixtures, and metals.

Carbon refractory layers may be deposited by first applying an organic substance, usually an organic polymer, in a suitable solvent. Conveniently, the organic in a solvent may be applied by immersion or spraying. The organic may then be converted to carbon by pyrolysis. Suitable organics include pitch in a toluene solvent, furfurol in an alcohol solvent, a phenolic resin in alcohol, and the like.

Carbon layers may also be deposited by chemical vapor deposition. For example, deposition may be carried out by exposing the partially densified articles to a hydrocarbon vapor, typically methane, at high temperatures, usually in the range from about 800 to 2000° C., more usually in the range from about 1000 to 1200° C. Carbon and ceramic materials may also be co-deposited by choosing an appropriate mixture of reactant gases. For example, methane and methyltrichlorosilane, usually in hydrogen, can be used to deposit a mixture of carbon and silicon carbide. Boron nitride can be introduced by adding boron trichloride and ammonia; borazine; or borazole to the reactant vapor.

Suitable metal refractory layers, such as nickle, may be introduced by eletroless plating.

Referring now to FIGS. 1-6, application of refractory interface layers in accordance with the method of the present invention will be described in detail. FIG. 1 illustrates a magnified portion of a woven reinforcement fabric 10 including a plurality of axial reinforcement strands 12 and transverse reinforcement strands 14. A first layer 16 of ceramic matrix material is formed over the fabric 10, as described in detail hereinabove. The effect of the first layer 16 is to partially fill voids 18

(FIG. 1) which exist between the woven strands 12 and 14.

Prior to performing the next densification step, a refractory interface layer 20 is deposited over the partially densified fabric 10, as illustrated in FIG. 3. The refractory interface layer 20 covers the interior surfaces of the partially-filled voids, including both the previously-introduced ceramic matrix layer 16 and the reinforcement strands 12 and 14.

After applying the first refractory interface layer 20, a second ceramic matrix layer 22 may be deposited, as illustrated in FIG. 4. After the second ceramic interface layer 22, a second refractory interface layer 24 will be applied, as illustrated in FIG. 5. The alternating application of ceramic matrix layers and refractory interface layers may be continued until a desired density is achieved. As illustrated in FIG. 6, substantially all of the voids 18 (FIG. 1) have been filled. Of course, it is not always necessary to fill all voids, and it will frequently be desirable to leave a certain void volume in order to reduce the density of the composite article and lower its dielectric properties.

The final product of this process will thus comprise a laminar structure including alternating layers of a refractory interface and a silicon carbide matrix. The product will usually include at least 2 matrix layers, more usually including from 3 to 6 matrix layers, and may include as many as 10 matrix layers. Such as laminar structure has been found to possess very high tensile and flexural strength and to resist failure due to crack propagation. The matrix barrier coating increases the fracture toughness of the composite in a similar manner to the barrier coating of the reinforcement fabric.

The following examples are offered by way of illustration, not by way of limitation.

EXPERIMENTAL

Materials and Methods

1. Reinforcement Fabric

A silicon carbide fabric (Nicalon ® available from Dow Corning, Midland, Michigan) was cut into swatches consisting of 8 plies weighing approximately 60 grams.

2. Deposition of Refractory Interface Layers

Carbon refractory interface layers were deposited on the fabric and between successive matrix layers as follows. Ashland 240 pitch (25g) was dissolved in toluene (250 ml). Organic insolubles from the pitch were collected by gravity filtration using Whatman No. 1 filter paper, and the collected insolubles were allowed to air dry at room temperature for 2 days. The organic insolubles were dissolved in trichlorobenzene at a concentration of 0.0075 gm/ml (for initial fabric coating) and 0.01 gm/ml (for coating between matrix layers).

The organic insolubles were then coated on the reinforcement fabric (before and after matrix impregnation) by immersing the fabric in the trichlorobenzene solution and drying at room temperature for 16 hours. The organic coating was then coverted to carbon by pyrolysis in a furnace by heating to 800° C. (at a rate of 1° C./min.) under nitrogen atmosphere. The 800° C. temperature was maintained for 2 hours.

3. Matrix Impregnation

The reinforcement fabric was densified by multiple impregnations with a silicon carbide matrix. The carbon barrier coated reinforcement fabric was impregnated with polycarbosilane, cured, and pyrolyzed. A polycarbosilane resin (with 15% by weight SiC whisker) mixture was used to produce a composite with approximately 40% fiber volume. After each of the subsequent carbon barrier coatings, the composite was further densified with polycarbosilane, cured, and pyrolized. Curing was performed by the method described earlier in the specification.

RESULTS

Composite articles prepared as described above were tested for density, flexural strength, and modulus of elasticity. The results are set forth in Table 2.

TABLE 2

| Nature of Composite | Number of Densifications | Density | Flexural Strength | Modulus |
|---|---|---|---|---|
| No Interface Layers | 1 | 1.73 gm/cm$^2$ | 7.6 ksi | 4.5 Msi |
| | 2 | 1.85 gm/cm$^2$ | 8.3 ksi | 5.6 Msi |
| | 3 | 1.97 gm/cm$^2$ | 8.9 ksi | 7.7 Msi |
| | 4 | 2.01 gm/cm$^2$ | 9.2 ksi | 8.5 Msi |
| | 5 | 2.05 gm/cm$^2$ | 8.6 ksi | 8.3 Msi |
| Interface Layer Over Fabric Only | 1 | 1.60 gm/cm$^2$ | 7.4 ksi | 2.0 Msi |
| | 2 | 1.74 gm/cm$^2$ | 14.0 ksi | 3.8 Msi |
| | 3 | 1.87 gm/cm$^2$ | 13.5 ksi | 5.4 Msi |
| | 4 | 1.96 gm/cm$^2$ | 13.4 ksi | 6.5 Msi |
| | 5 | 2.0 gm/cm$^2$ | 15.1 ksi | 7.5 Msi |
| Interface Layers Over Fabric And Between Matrix Layers | 1 | 1.02 gm/cm$^2$ | 8.4 ksi | 2.3 Msi |
| | 2 | 1.66 gm/cm$^2$ | 12.4 ksi | 4.9 Msi |
| | 3 | 1.84 gm/cm$^2$ | 20.5 ksi | 3.7 Msi |
| | 4 | 1.93 gm/cm$^2$ | 29.4 ksi | 5.0 Msi |
| | 5 | 1.96 gm/cm$^2$ | 34.9 ksi | 5.9 Msi |

The results demonstrate that inclusion of refractory interface layers between successive matrix layers provides a substantial improvement in both flexural strength and toughness when compared in composites lacking the interface layers. The improvement is furthered by inclusion of an interface layer over the fabric before the initial matrix layer.

Although the foregoing invention has been described in some detail by way of illustration and example for purposes of clarity of understanding, it will be obvious that certain changes and modifications may be practiced within the scope of the appended claims.

What is claimed is:

1. A process for forming ceramic composite articles, said process comprising:
    (a) introducing a ceramic precursor material onto a reinforcement fabric substrate;
    (b) curing the ceramic precursor;
    (c) converting the cured ceramic precursor material to a ceramic matrix layer by pyrolysis in an inert atmosphere at a pressure below about 50 psi;
    (d) applying a refractory interface layer over the converted ceramic matrix layer; and
    (e) densifying the article by repeating steps (a) through (d) until a desired density is achieved.

2. A process as in claim 1, wherein the refractory interface layer has a thickness in the range from about 0.1 to 3.0 μm.

3. A process as in claim 1, wherein the refractory interface layer is composed of a material selected from the group consisting of carbon, a carbon-ceramic mixture, and a metal.

4. A process as in claim 3, wherein the carbon refractory interface layer is applied by coating the ceramic matrix with an organic polymer and pyrolytically converting the organic polymer to carbon.

5. A process as in claim 3, wherein the carbon refractory interface layer is applied by vapor deposition.

6. A process as in claim 3, wherein the carbon-ceramic mixture refractory layer is applied by vapor co-deposition of carbon and the ceramic.

7. A process as in claim 3, wherein the metal refractory interface layer is applied by electroless plating.

8. A process as in claim 1, wherein a refractory interface layer is applied over the ceramic matrix layer prior to initial introduction of the ceramic precursor material.

9. A process as in claim 1, wherein the ceramic precursor material is an organometallic substance selected from the group consisting of polycarbosilanes, alumina organometallics, and mullite organometallics.

10. A process as in claim 1, wherein the ceramic precursor material is a liquid organometallic substance including a ceramic powder filler in an amount from about 10 to 50 percent by volume.

11. A process as in claim 10, wherein the ceramic powder filler is selected from the group consisting of alumina, silicon dioxide, boron nitride, silicon nitride, and silicon carbide.

12. A process as in claim 11, wherein the ceramic precursor material is a liquid polycarbosilane including a silicon carbide powder filler.

13. An improved process for forming ceramic composite articles of the type wherein a plurality of ceramic matrix layers are formed over a reinforcement fabric substrate, said improvement comprising applying a refractory interface layer between successive ceramic reinforcement layers, wherein there are at least two such successive ceramic reinforcement layers.

14. An improved process as in claim 13, wherein the refractory interface layers have a thickness in the range from about 0.1 to 3.0 μm.

15. An improved process as in claim 13, wherein the refractory interface layers are composed of a material selected from the group consisting of carbon, a carbon-ceramic mixture, and a metal.

16. An improved process as in claim 15, wherein the carbon refractory interface layer is applied by coating the ceramic matrix with an organic polymer and pyrolytically converting the organic polymer to carbon.

17. An improved method as in claim 15, wherein the carbon-ceramic refractory interface layer is applied by coating with a dilute solution of a liquid containing an organometallic or ceramic material, curing the liquid, and pyrolizing the cured liquid.

18. An improved process as in claim 15, wherein the refractory interface layer is applied by vapor deposition.

19. An improved process as in claim 15, wherein the carbon-ceramic mixture refractory layer is applied by vapor co-deposition of carbon and the ceramic.

20. An improved process as in claim 15, wherein the metal refractory interface layer is applied by electroless plating.

21. A ceramic composite article comprising a reinforcement fabric, a plurality of ceramic matrix layers formed over the reinforcement fabric, and a refractory interface layer between at least some of the successive pairs of ceramic matrix layers.

22. A ceramic composite article as in claim 21, wherein the reinforcement fabric is composed of a material selected from the group consisting of carbon, alumina, silicon dioxide, boron nitride, and silicon carbide.

23. A ceramic composite article as in claim 21, wherein the ceramic matrix layers are composed of a material selected from the group consisting of carbon, alumina, silicon dioxide, boron nitride, silicon carbide, titanium, oxide, and mullite.

24. A ceramic composite article as in claim 21, wherein the refractory interface layer has a thickness in the range from about 0.1 to 3.0 μm.

25. A ceramic composite article as in claim 21, wherein the refractory interface layer is composed of a material selected from the group consisting of carbon, a carbon-ceramic mixture, and a metal.

26. A ceramic composite article as in claim 21, further comprising a refractory interface layer between the reinforcement fabric and the first ceramic matrix layer.

27. A ceramic composite article formed by the process of claim 1.

28. A ceramic composite article formed by the process of claim 13.

29. A process for forming ceramic composite articles, said process comprising:
    introducing a liquid polycarbosilane onto a reinforcement fabric substrate;
    curing the polycarbosilane at an elevated temperature under non-oxidizing conditions; and
    converting the cured polycarbosilane to silicon carbide by pyrolysis in an inert atmosphere at a pressure below about 50 psi.

30. A process as in claim 29, wherein the liquid polycarbosilane includes a ceramic powder filler in an amount from about 10 to 50 percent by volume.

31. A process as in claim 30, wherein the ceramic powder filler is selected from the group consisting of alumina, silicon dioxide, boron nitride, silicon nitride, and silicon carbide.

32. A process as in claim 29, wherein the liquid polycarbosilane is introduced by immersion of the reinforcement fabric or by extrusion and pressing into the reinforcement fabric.

33. A process as in claim 29, wherein the liquid polycarbosilane is introduced by manual application of successive layers.

34. A process as in claim 29, wherein the polycarbosilane is cured at a temperature in the range from about 150° C. to 250° C. for a time period of from about 1 to 10 hours.

35. A process as in claim 34, wherein the polycarbosilane is degassed under a vacuum prior to curing.

36. A process as in claim 29, wherein the pyrolysis step includes heating the cured polycarbosilane at from about 200° C. to 350° C. for a period of from about 1 to 5 hours, thereafter increasing the temperature at a rate of from about 5° C./hour to 10° C./hour to a temperature of about 400° C., and thereafter increasing the temperature at a rate of from about 35° C./hour to 70° C./hour to a final temperature of from about 800° C. to 1600° C.

37. A process as in claim 36, wherein the final temperature is below about 1200° C. and the silicon carbide is amorphous in nature.

38. A process as in claim 36, wherein the final temperature is above about 1200° C. and the silicon carbide is crystalline in nature.

39. A process for forming ceramic composite articles, said process comprising:
    (a) forming a refractory interface layer on a reinforcement fabric;

(b) introducing a liquid polycarbosilane onto the reinforcement fabric over the refractory interface layer;

(c) curing the polycarbosilane at an elevated temperature under non-oxidizing conditions;

(d) converting the cured polycarbosilane to silicon carbide by pyrolysis at a temperature below about 50 psi; and (e) densifying the article by repeating steps (a) through (d) until a desired density is achieved.

40. A process as in claim 39, wherein the refractory interface layer is formed by chemical vapor deposition of a material selected from the group consisting of carbon, boron nitride, alumina, silicon dioxide, and silicon carbide to a thickness in the range from about 0.1 to 3μm.

41. A process as in claim 39, wherein the refractory interface layer is formed by applying an organic precursor and pyrolyzing the precursor to form a carbon layer in the range from 0.1 to 3μm.

42. A process as in claim 39, wherein the liquid polycarbosilane includes a ceramic powder filler in an amount from about 10 to 50 percent by volume.

43. A process as in claim 42, wherein the ceramic powder filler is selected from the group consisting of alumina, silicon dioxide, boron nitride, carbon and silicon carbide.

44. A process as in claim 39, wherein the liquid polycarbosilane is introduced by immersion of the reinforcement fabric or by extrusion and pressing into the reinforcement fabric.

45. A process as in claim 39, wherein the liquid polycarbosilane is introduced by manual application of successive layers.

46. A process as in claim 39, wherein the polycarbosilane is cured at a temperature in the range from about 150° C. to 250° C. for a time period of from about 2 to 10 hours.

47. A process as in claim 46, wherein the polycarbosilane is degassed under a vacuum prior to curing.

48. A process as in claim 39, wherein the pyrolysis step includes heating the cured polycarbosilane at from about 200° C. to 350° C. for a period of from about 1 to 5 hours, thereafter increasing the temperature at a rate of from about 5° C./hour to 10° C./hour to a temperature of about 400° C., and thereafter increasing the temperature at a rate of from about 35° C./hour to 70° C./hour to a final temperature of from about 800° C. to 1600° C.

49. A process as in claim 48, wherein the final temperature is below about 1200° C. and the silicon carbide is amorphous in nature.

50. A process as in claim 48, wherein the final temperature is above about 1200° C. and the silicon carbide is crystalline in nature.

51. A ceramic composite article comprising a reinforcement fabric and a silicon carbide matrix, wherein the silicon carbide matrix is characterized by alternate silicon carbide layers and refractory interface layers.

52. A ceramic composite article as in claim 51, wherein the reinforcement fabric substrate is composed of a material selected from the group consisting of carbon, alumina, silicon dioxide, boron nitride, and silicon carbide.

53. A ceramic composite article as in claim 51, wherein the silicon carbide layers were formed by curing and converting a liquid polycarbosilane.

54. A ceramic composite article as in claim 51, wherein the refractory interface layers were formed by chemical vapor deposition of a material selected from the group consisting of alumina, silicon dioxide, boron nitride, and silicon carbide.

55. A ceramic composite article as in claim 51, wherein the refractory interface layers were formed by pyrolysis of an organic layer applied to the article.

56. A ceramic composite article produced by the process of claim 29.

57. A ceramic composite article produced by the process of claim 39.

* * * * *